United States Patent
Kurashima et al.

(10) Patent No.: US 7,525,477 B2
(45) Date of Patent: Apr. 28, 2009

(54) DISTANCE MEASURING DEVICE

(75) Inventors: Shigemi Kurashima, Shinagawa (JP);
Masahiro Yanagi, Shinagawa (JP);
Takuya Uchiyama, Shinagawa (JP);
Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 11/331,073

(22) Filed: Jan. 13, 2006

(65) Prior Publication Data
US 2006/0158370 A1 Jul. 20, 2006

(30) Foreign Application Priority Data
Jan. 17, 2005 (JP) ............................. 2005-008493

(51) Int. Cl.
*G01S 13/10* (2006.01)
*G01S 13/08* (2006.01)
*H04B 1/06* (2006.01)
*G01S 13/00* (2006.01)

(52) U.S. Cl. ................. 342/135; 342/118; 342/134; 342/145; 342/175; 342/195

(58) Field of Classification Search .............. 342/82, 342/89, 118, 120–146, 175, 195; 375/130–153
See application file for complete search history.

(56) References Cited

U.S. PATENT DOCUMENTS

| 1,756,462 | A | * | 4/1930 | Jenkins ........................ 342/120 |
| 3,167,766 | A | * | 1/1965 | Norris, Jr. ................... 342/122 |
| 3,611,377 | A | * | 10/1971 | Rittenbach .................. 342/128 |
| 4,325,138 | A | * | 4/1982 | Zscheile, Jr. ................ 375/130 |
| 5,179,573 | A | * | 1/1993 | Paradise ..................... 375/150 |
| 5,387,917 | A | * | 2/1995 | Hager et al. ................ 342/122 |
| 6,255,984 | B1 | * | 7/2001 | Kreppold et al. ........... 342/128 |
| 6,278,398 | B1 | * | 8/2001 | Vossiek et al. ............. 342/128 |

FOREIGN PATENT DOCUMENTS

| GB | 1480587 A | * | 7/1977 | ................. 342/120 |
| JP | 10-282216 | | 10/1998 | |
| JP | 2001-33543 | | 2/2001 | |
| JP | 2003-174368 | | 6/2003 | |

* cited by examiner

*Primary Examiner*—Bernarr E Gregory
(74) *Attorney, Agent, or Firm*—Staas & Halsey LLP

(57) ABSTRACT

A distance measuring device includes: an impulse generator that generates an impulse; a transmission antenna that transmits the impulse generated by the impulse generator; a reception antenna that receives a reflected signal of the impulse transmitted from the transmission antenna and reflected by the object, and a leakage signal of the impulse transmitted from the transmission antenna; and a distance calculator that calculates the distance to the object, based on the time difference between the reflected signal and the leakage signal received by the reception antenna.

7 Claims, 14 Drawing Sheets

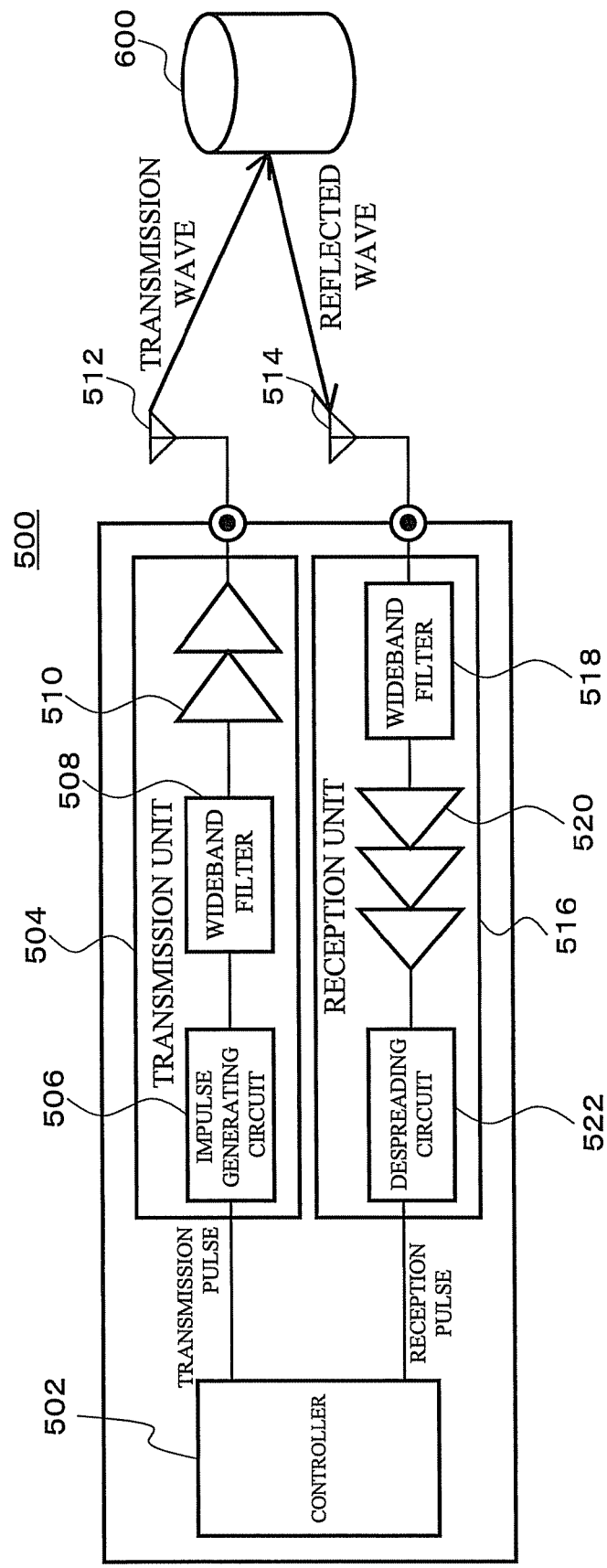

Fig. 4A
TRANSMISSION
PULSE
Fig. 4B
IMPULSE
Fig. 4C
TRANSMISSION
WAVE SIGNAL
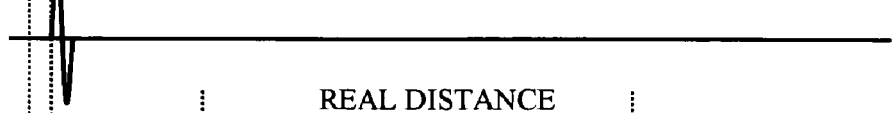
Fig. 4D
LEAKAGE WAVE
SIGNAL
Fig. 4E
REFLECTED WAVE
SIGNAL
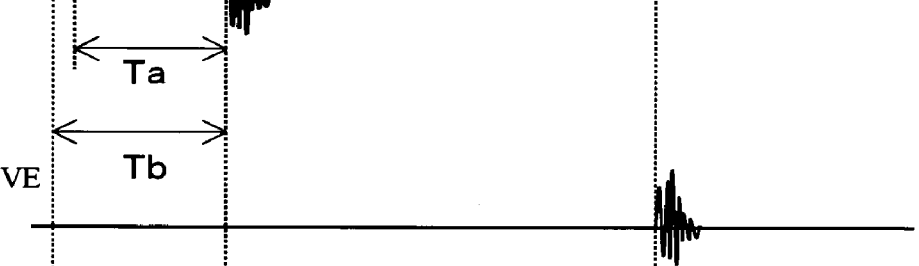
Fig. 4F
RECEPTION PULSE
IN RELATION TO
LEAKAGE SIGNAL
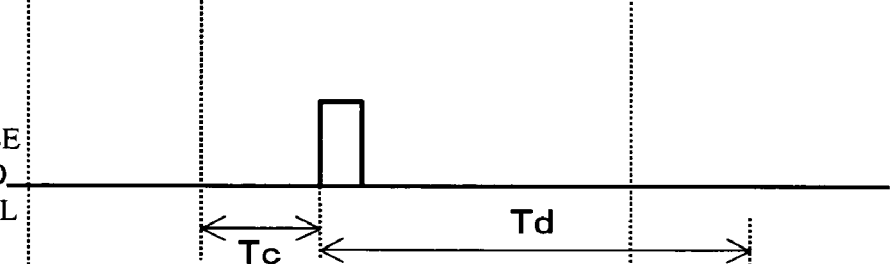
Fig. 4G
RECEPTION PULSE
IN RELATION TO
REFLECTED
WAVE SIGNAL
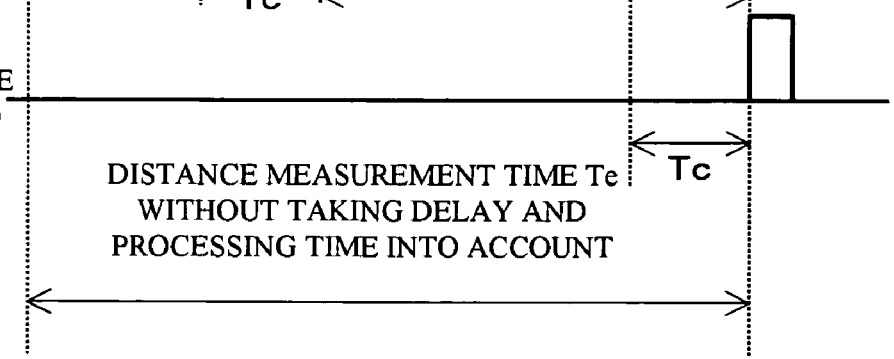
DISTANCE MEASUREMENT TIME Te
WITHOUT TAKING DELAY AND
PROCESSING TIME INTO ACCOUNT

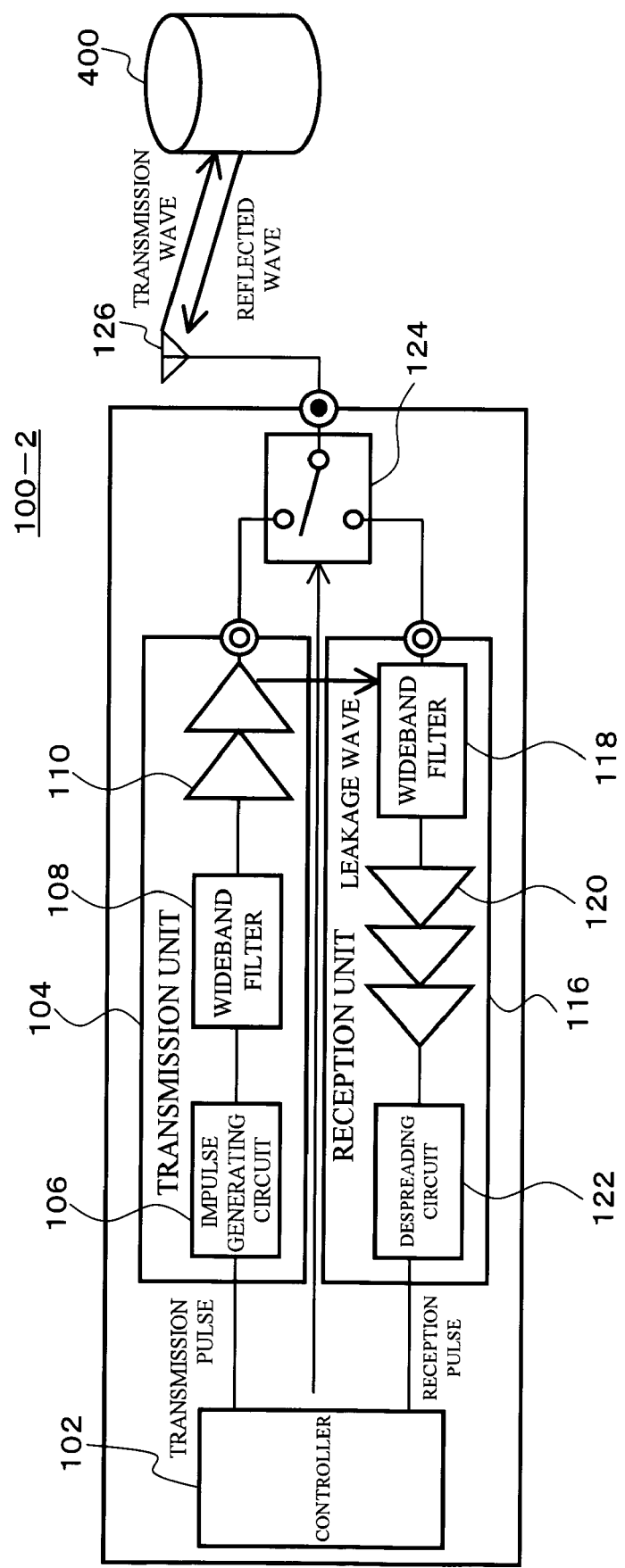

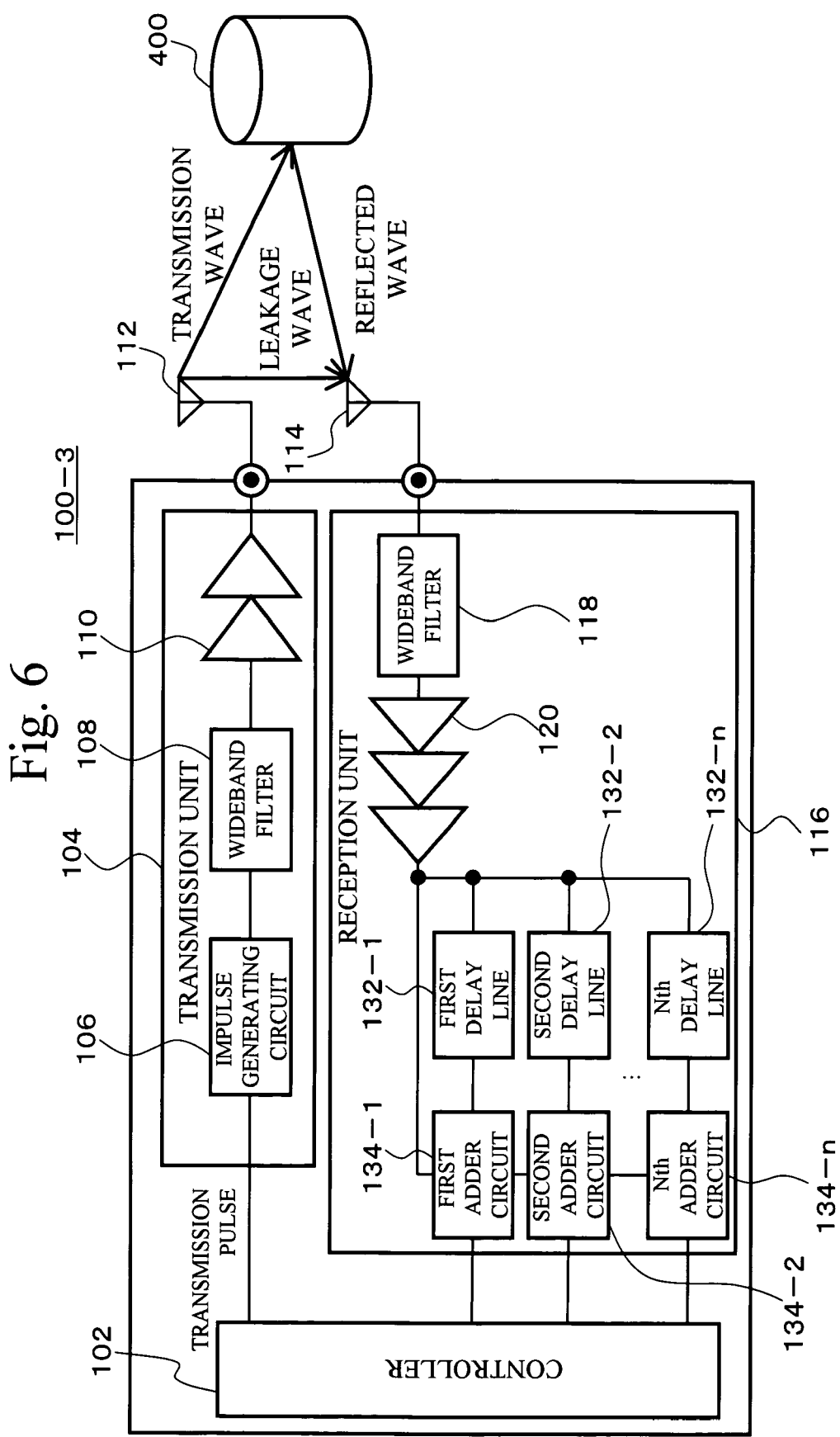

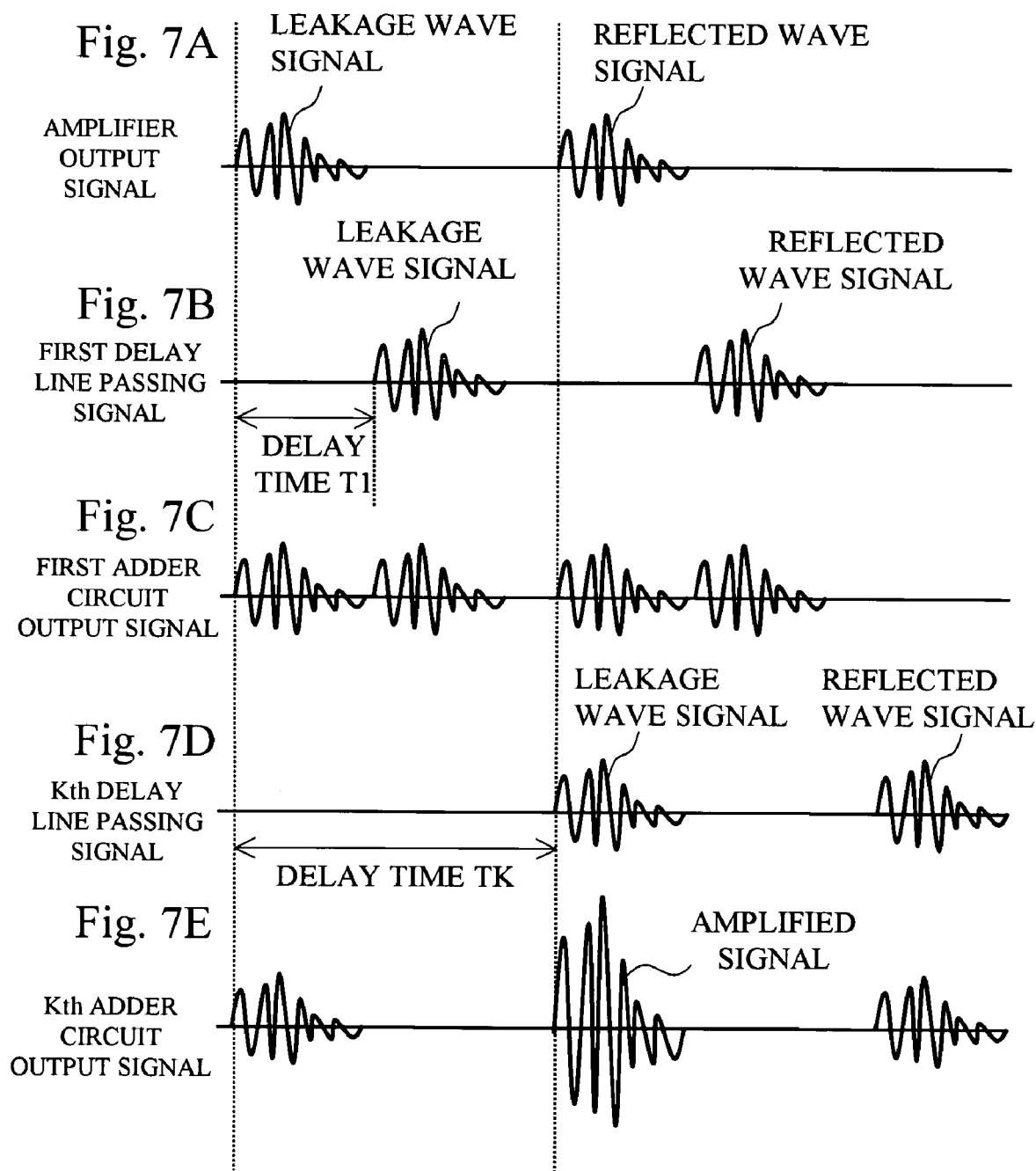

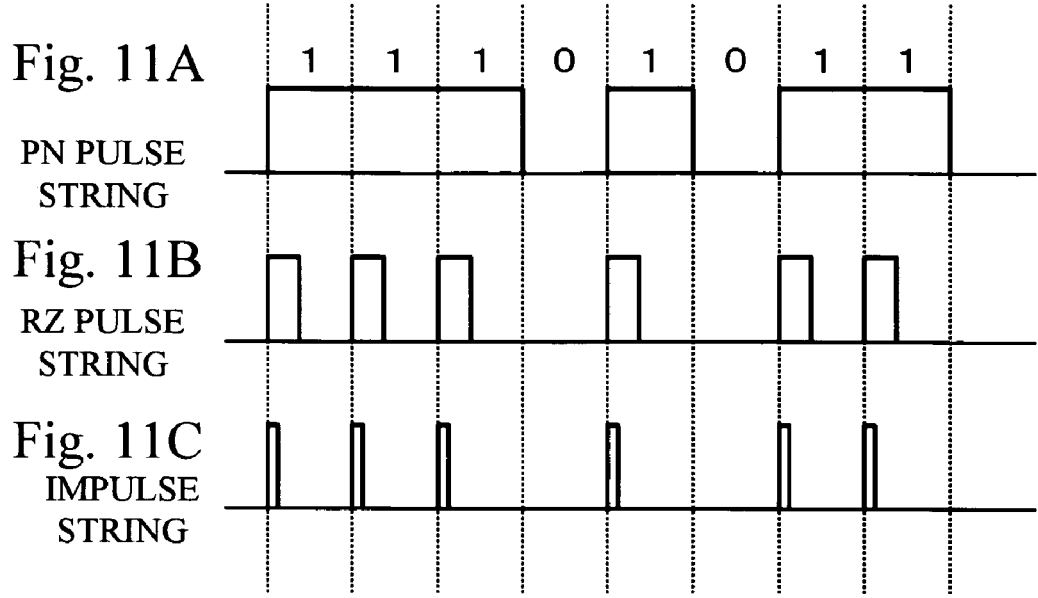
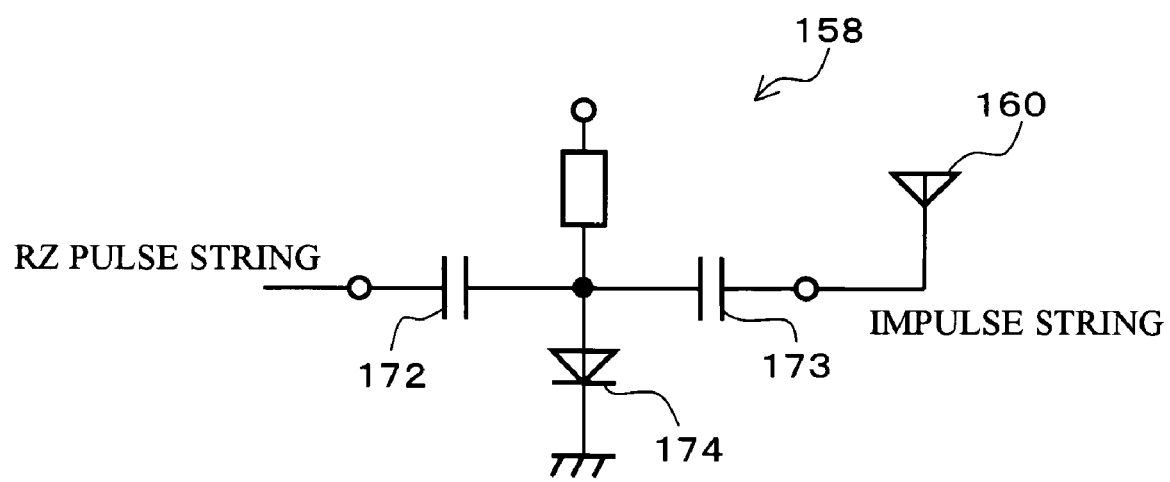

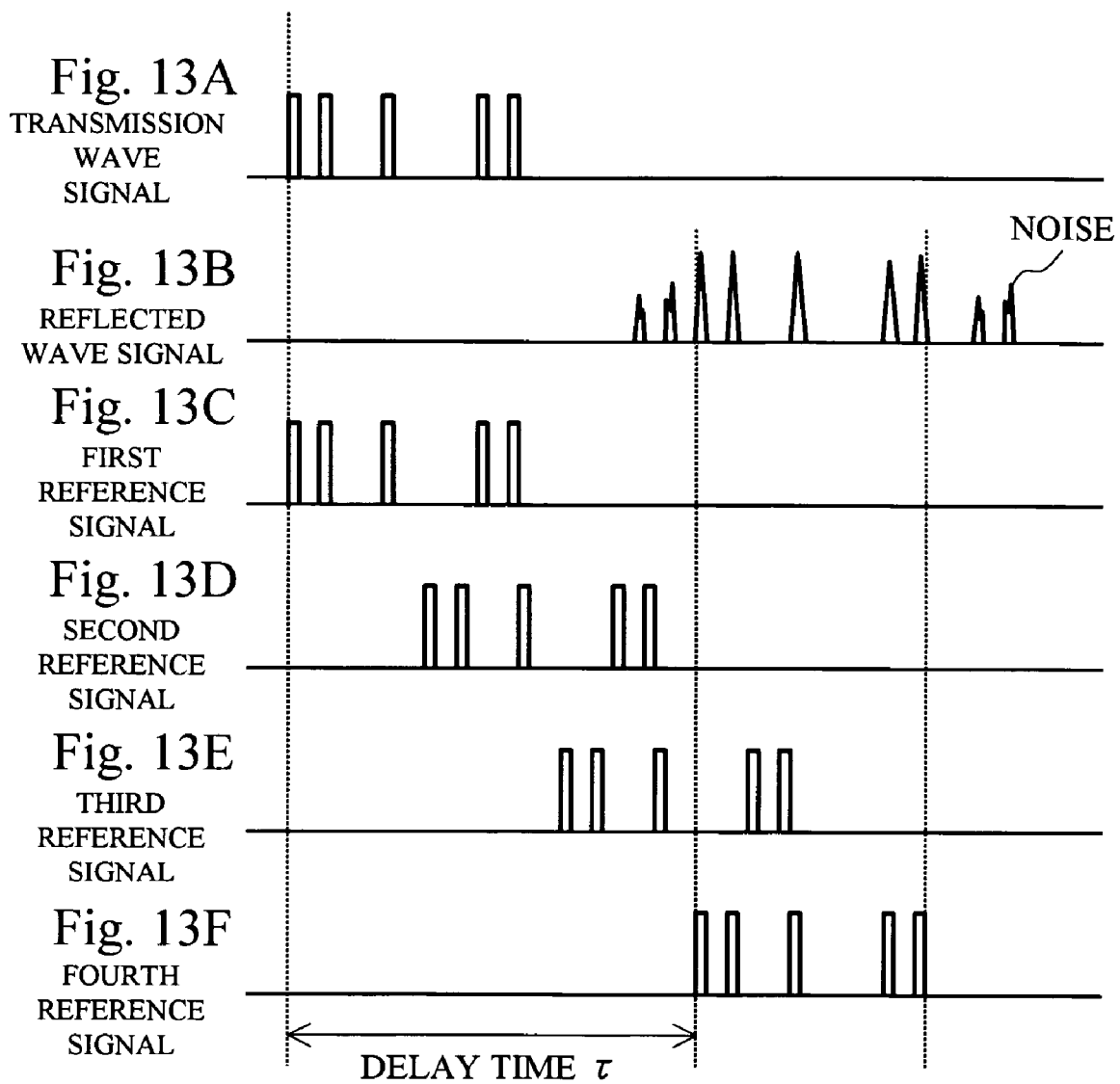

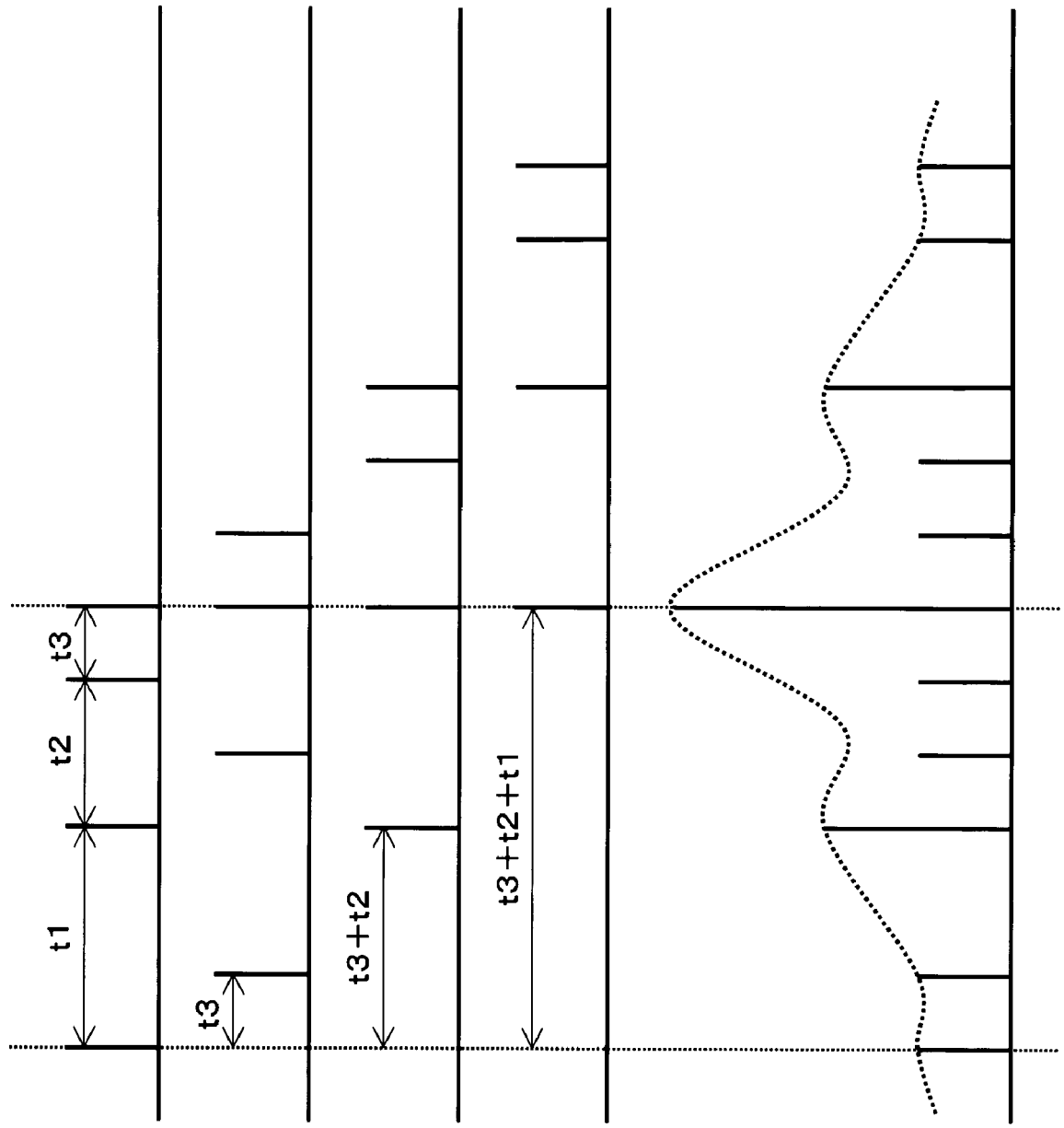

DISTANCE MEASURING DEVICE

BACKGROUND OF THE INVENTION

1. Field of the Invention

The present invention relates to a distance measuring device that measures the distance to an object.

2. Description of the Related Art

There have been various distance measuring devices developed for measuring the distances to objects, as disclosed in Japanese Unexamined Patent Publication Nos. 10-282216, 2001-33543, and 2003-174368, for example. FIG. 1 illustrates the structure of a distance measuring unit that is a conventional distance measuring device. In the distance measuring unit 500 illustrated in FIG. 1, an impulse generating circuit 506 in a transmission unit 504 receives a transmission pulse from a controller 502, and generates an ultrashort pulse (impulse) through a spreading process. This impulse is transmitted as a transmission wave signal from the transmission antenna 512 via a wideband filter 508 and a wideband amplifier 510. The transmission wave signal is reflected by a distance measurement object 600 and is received by a reception antenna 514. The reflected wave signal is then sent to a despreading circuit 522 via a wideband filter 518 and a wideband low noise amplifier 520. The despreading circuit 522 performs despreading on the reflected wave signal, and then outputs a reception pulse. Based on the time difference between the output of the transmission pulse and the input of the reception pulse, the controller 502 determines the distance L to the distance measurement object 600. With the time difference between the output of the transmission pulse and the input of the reception pulse being t and the speed of light being c, the distance L can be determined by the equation $$L=c\times t/2.$$

By the above described distance measuring technique, however, the time difference between the output of the transmission pulse and the input of the reception pulse contains delays caused at the wideband filter 508 and the wideband amplifier 510 in the transmission unit 504, the transmission antenna 512, the reception antenna 512, and the wideband filter 518 and the wideband low noise amplifier 520 in the reception unit 516, the time spent for the despreading process by the despreading circuit 522, the time spent for the processing by the controller 502, and the likes. As a result, an error is caused in the distance measurement.

Furthermore, the impulse generated from the transmission pulse is expanded at each of the wideband filter 508, the wideband amplifier 510, and the transmission antenna 512. Because of this, several peaks exist in the reception pulse, and therefore, it is difficult to determine which peak should be considered to be the timing of the input of the reception pulse. Also in this aspect, an error is often caused. In a case where the transmission pulse is the one shown in FIG. 2A, for example, the reception pulse have several peaks as shown in FIG. 2B. Even if the device is designed so that the timing of the input of the reception pulse is a peak with a reception intensity of V2 or higher, the measured distance varies depending on which peak is selected as the input timing among peaks p1 through p4.

SUMMARY OF THE INVENTION

It is therefore an object of the present invention to provide a distance measuring device in which the above disadvantage is eliminated.

A more specific object of the present invention is to provide a distance measuring device that performs distance measurement with higher precision.

According to an aspect of the present invention, there is provided a distance measuring device that measures the distance to an object, comprising: an impulse generator that generates an impulse; a transmission antenna that transmits the impulse generated by the impulse generator; a reception antenna that receives a reflected signal of the impulse transmitted from the transmission antenna and reflected by the object, and a leakage signal of the impulse transmitted from the transmission antenna; and a distance calculator that calculates the distance to the object, based on the time difference between the reflected signal and the leakage signal received by the reception antenna.

According to another aspect of the present invention, there is provided a distance measuring device that measures the distance to an object, comprising: an impulse generator that generates an impulse; a transmission antenna that transmits the impulse generated by the impulse generator; a reception antenna that receives a reflected signal of the impulse transmitted from the transmission antenna and reflected by the object; a leakage signal receiver that receives a leakage signal of the impulse generated by the impulse generator; and a distance calculator that calculates the distance to the object, based on the time difference between the reflected signal received by the reception antenna and the leakage signal received by the leakage signal receiver.

According to a further object of the present invention, there is provided a distance measuring device that measures the distance to an object, comprising: an impulse string generator that generates an impulse string based on a pseudo-noise code; a transmission antenna that transmits the impulse string generated by the impulse string generator; and a reception antenna that receives a reflected signal of the impulse string transmitted from the transmission antenna and reflected by the object; and a distance calculator that calculates the distance to the object, based on the correlation between the reflected signal received by the reception antenna and the pseudo-noise code.

As described above, a distance measuring device in accordance with the present invention calculates the distance to an object, based on the time difference between a reflected signal and a leakage signal. Thus, more accurate distance measurement can be performed, with the delays caused in the distance measurement device being eliminated.

BRIEF DESCRIPTION OF THE DRAWINGS

Other objects, features and advantages of the present invention will become more apparent from the following detailed description when read in conjunction with the accompanying drawings, in which:

FIG. 1 is a block diagram of a conventional distance measuring unit;

FIGS. 4A through 4G show example signal waveforms in the first distance measuring unit;

FIG. 5 is a block diagram of a second distance measuring unit in accordance with the present invention;

FIG. 6 is a block diagram of a third distance measuring unit in accordance with the present invention;

FIGS. 7A through 7E show example signal waveforms in the third distance measuring unit;

FIGS. 11A through 11C show example signal waveforms in the sixth distance measuring unit;

FIG. 12 is a block diagram of the impulse generator of the sixth distance measuring unit;

FIGS. 13A through 13F show other example signal waveforms in the sixth distance measuring unit;

FIGS. 16A through 16E show example signal waveforms in the delay/combiner circuit.

DESCRIPTION OF THE PREFERRED EMBODIMENTS

The following is a description of distance measuring devices as embodiments of the present invention, with reference to the accompanying drawings.

Figure 2A:
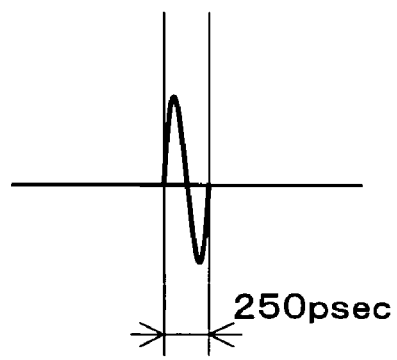
FIGS. 2A and 2B show the correlation between a transmission pulse and a reception pulse.
Figure 2B:
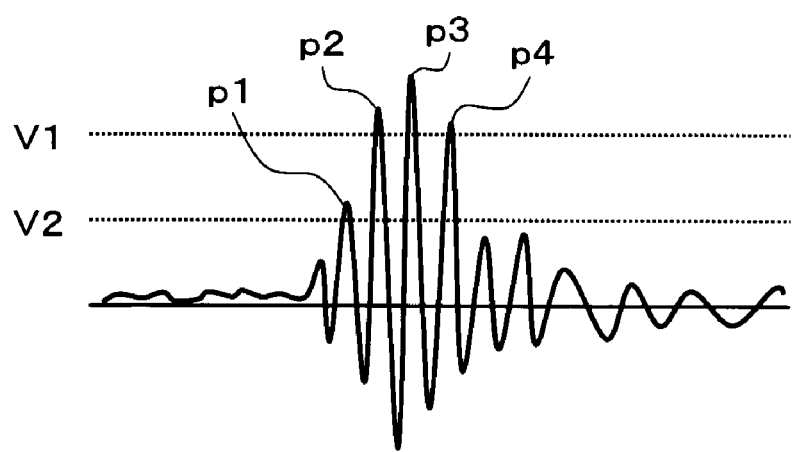
Figure 3:
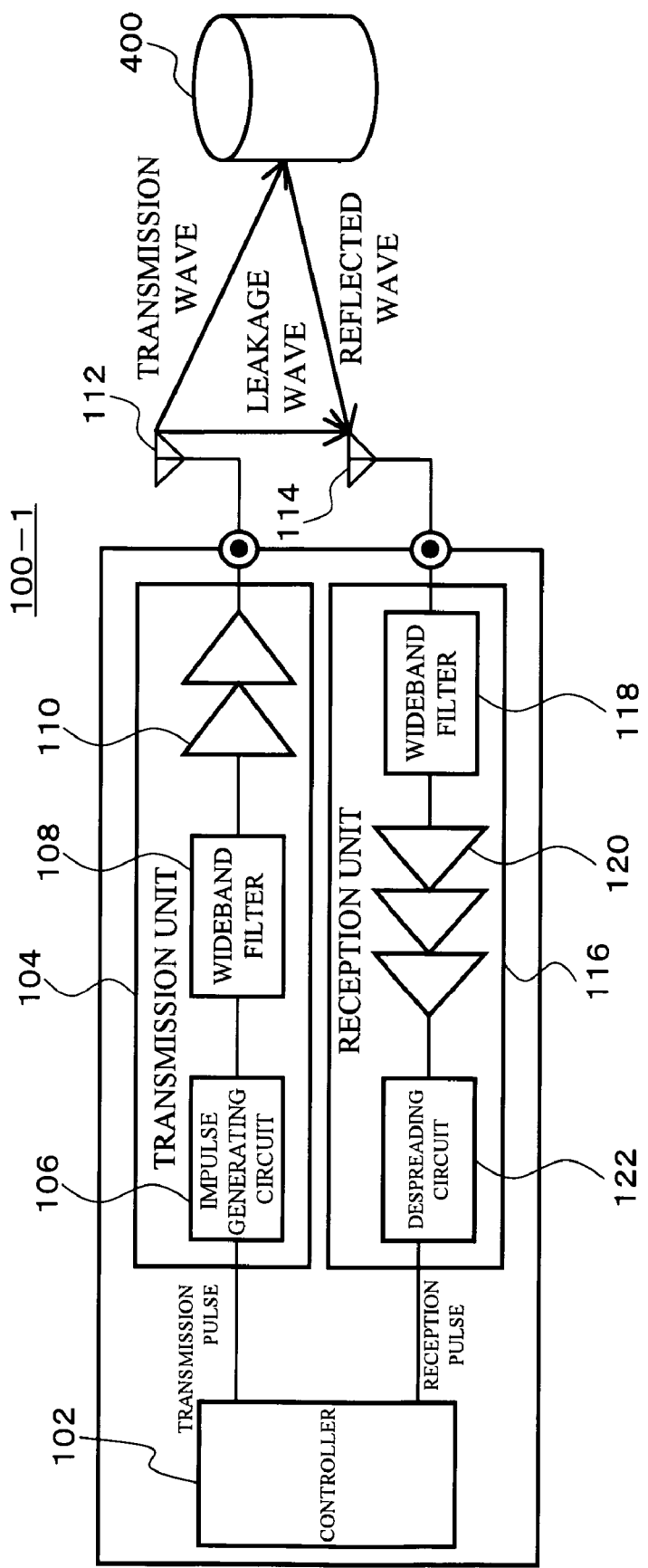
FIG. 3 is a block diagram of a first distance measuring unit in accordance with the present invention.

FIG. 3 is a block diagram of a first distance measuring unit as a distance measuring device of the present invention. The distance measuring unit 100-1 shown in FIG. 3 is to measure the distance to a distance measurement object 400. The distance measuring unit 100-1 includes a controller 102, a transmission unit 104, a transmission antenna 112, a reception antenna 114, and a reception unit 116. The transmission unit 104 is formed with an impulse generating circuit 106, a wideband filter 108, and a wideband amplifier 110. The reception unit 116 is formed with a wideband filter 118, a wideband low noise amplifier 120, and a despreading circuit 122.

Next, the operation of the distance measuring unit shown in FIG. 3 is described.

The controller 102 outputs a transmission pulse (see FIG. 4A). The impulse generating circuit 106 in the transmission unit 104 receives the transmission pulse from the controller 102, and performs a diffusing operation using a predetermined spread code so as to generate and output impulse (see FIG. 4B). The wideband filter in the transmission unit 104 eliminates a predetermined frequency component from the impulse generated by the impulse generating circuit 106, and then outputs the resultant impulse. The wideband amplifier 110 in the transmission unit 104 amplifies and outputs the impulse supplied from the wideband filter 108. The transmission antenna 112 transmits the impulse from the wideband amplifier 110 as a transmission wave signal.

The timing of the transmission of the transmission wave signal from the transmission antenna 112 is behind the timing of the output of the transmission pulse from the controller 102 by time Tb, and is behind the timing of the output of the impulse from the impulse generating circuit 106 by time Ta, due to the delay caused at each of the wideband filter 108, the wideband amplifier 110, and the transmission antenna 112, as well as the operating time required at the controller 102.

The transmission wave signal transmitted from the transmission antenna 112 is reflected by the distance measurement object 400. The reception antenna 114 receives the reflected wave signal (see FIG. 4E). The reception antenna 114 also receives a leakage wave signal that leaks from the transmission antenna 112. Since the transmission antenna 112 and the reception antenna 114 are located in proximity to each other, the timing of the transmission of the transmission wave signal from the transmission antenna 112 is substantially the same as the timing of the reception of the leakage wave signal by the reception antenna 114. Accordingly, the timing of the reception of the leakage wave signal by the reception antenna 114 is behind the timing of the output of the transmission pulse from the controller 102 by the time Tb, and is behind the timing of the output of the impulse from the impulse generating circuit 106 by the time Ta, as shown in FIG. 4D.

The wideband filter 118 in the reception unit 116 eliminates a predetermined frequency component from each of the reflected wave signal and the leakage wave signal received through the reception antenna 114, and outputs the reflected wave signal and the leakage wave signal minus the predetermined frequency component. The wideband low noise amplifier 120 in the reception unit 116 amplifies and outputs the reflected wave signal and the leakage wave signal supplied from the wideband filter 118. On the reflected wave signal and the leakage wave signal supplied from the wideband filter 118, the despreading circuit 122 performs a despreading operation using the same spread code as that used by the impulse generating circuit 106 in the transmission unit 104, and outputs reception pulses with respect to the reflected wave signal and the leakage wave signal.

Based on the time difference between the reception pulse with respect to the reflected wave signal and the reception pulse with respect to the leakage wave signal, the controller 102 calculates the distance to the distance measurement object 400.

As shown in FIG. 4F, the timing of the input of the reception pulse with respect to the leakage wave signal to the controller 102 is behind the timing of the reception of the leakage wave signal by the reception antenna 114 by time Tc, due to the delay caused at each of the reception antenna 114, the wideband filter 118, and the wideband low noise amplifier 120, as well as the time required in the back-diffusing operation by the despreading circuit 122. Likewise, as shown in FIG. 4G, the timing of the input of the reception pulse with respect to the reflected wave signal to the controller 102 is behind the timing of the reception of the leakage wave signal by the reception antenna 114 by the time Tc, due to the delay caused at each of the reception antenna 114, the wideband filter 118, and the wideband low noise amplifier 120, as well as the time required in the back-diffusing operation by the despreading circuit 122. Accordingly, the time difference Td between the timing of the input of the reception pulse with respect to the leakage wave signal to the controller 102 and the timing of the input of the reception pulse with respect to the reflected wave signal to the controller 102 is equal to the time difference between the timing of the transmission of the transmission wave signal from the transmission antenna 112 and the timing of the reception of the reflected wave signal by the reception antenna 114.

The time difference between the transmission of the transmission wave signal by the transmission antenna 112 and the reception of the reflected wave signal by the reception antenna 114 represents the time (the real distance measurement time) during which the signal travels back and force between the distance measuring unit 100-1 and the distance measurement object 400, as the delays caused in the distance measuring unit 100-1 is eliminated. Using the time difference Td between the input of the reception pulse with respect to the leakage wave signal and the input of the reception pulse with respect to the reflected wave signal and the speed of light c, the controller 102 calculates the distance L to the distance measurement object 400 by the equation $$L = c \times Td/2.$$

Conventionally, the distance L to the distance measurement object 400 has been calculated by the equation $$L = c \times Te/2,$$

with c representing the speed of light and Te representing the time difference between the output of the transmission pulse from the controller 102 and the input of the reception pulse to the controller 102 (see FIGS. 4A through 4G). Therefore, the distance measurement time Te contains the delay caused at each of the wideband filter 108, the wideband amplifier 110, the transmission antenna 112, the reception antenna 114, the wideband filter 118, and the wideband low noise amplifier 120, the time required for the back-diffusing operation by the despreading circuit 122, and the time required for the operations at the controller 102. As a result, the measured distance contains an error.

In the distance measuring unit 100-1, on the other hand, the distance L to the distance measurement object 400 is measured using the time difference between the input of the reception pulse with respect to the leakage wave signal and the input of the reception pulse with respect to the reflected wave signal, which is the time difference Td between the transmission of the transmission wave signal from the transmission antenna 112 and the reception of the reflected wave signal by the reception antenna 114. Thus, more accurate distance measurement can be performed, with the delays caused in the distance measuring unit 100-1 being eliminated.

FIG. 5 is a block diagram of a second distance measuring unit as a distance measuring device. Unlike the first distance unit 100-1, the distance measuring unit 100-2 shown in FIG. 5 has a transmission/reception antenna 126 in place of the transmission antenna 112 and the reception antenna 114, and also has a switch 124 that selectively switches outputs between the impulse from the transmission unit 104 to the transmission/reception antenna 126 and the reflected wave signal from the transmission/reception antenna 126 to the reception unit 116.

In the distance measuring unit 100-2, the wideband amplifier 110 in the transmission unit 104 amplifies and then outputs the impulse from the wideband filter 108. In accordance with the output timing, the controller 102 controls the switch 124 so that the impulse from the wideband amplifier 110 is output to the transmission/reception antenna 126. The transmission/reception antenna 126 transmits the impulse from the wideband amplifier 110 as a transmission wave signal. The transmission wave signal transmitted from the transmission/reception antenna 126 is reflected by the distance measurement object 400. The transmission/reception antenna 126 then receives the reflected wave signal. In accordance with the reception timing, the controller 102 controls the switch 124 so that the impulse from the transmission/reception antenna 126 is input to the wideband filter 118 in the reception unit 116.

The wideband filter 118 eliminates a predetermined frequency component from the reflected wave signal supplied through the transmission/reception antenna 126, and then outputs the resultant signal. The wideband filter 118 also receives a leakage wave signal with respect to the impulse leaking from the transmission unit 104. A predetermined frequency component is also eliminated from the leakage wave signal, and the resultant signal is then output. The wideband low noise amplifier 120 amplifies and then outputs the reflected wave signal and the leakage wave signal supplied from the wideband filter 118. On the reflected wave signal and the leakage wave signal from supplied the wideband filter 118, the despreading circuit 122 performs a despreading operation using the same spread code as that used by the impulse generating circuit 106 in the transmission unit 104. The despreading circuit 122 then outputs reception pulses with respect to the reflected wave signal and the leakage wave signal.

Based on the time difference between the reception pulse with respect to the reflected wave signal and the reception pulse with respect to the leakage wave signal, the controller 102 calculates the distance to the distance measurement object 400. Here, the time difference between the input of the reception pulse with respect to the leakage wave signal by the controller 102 and the input of the reception pulse with respect to the reflected wave signal by the controller 102 is equal to the time difference between the input of the leakage wave signal by the wideband filter 118 and the input of the reflected wave signal by the wideband filter 118. Further, the timing of the input of the leakage wave signal by the wideband filter 118 is substantially equal to the timing of the transmission of the transmission wave signal by the transmission/reception antenna 126. Accordingly, the time difference between the input of the reception pulse with respect to the leakage wave signal by the controller 102 and the input of the reception pulse with respect to the reflected wave signal by the controller 102 is equal to the time difference between the transmission of the transmission wave signal by the transmission/reception antenna 126 and the reception of the reflected wave signal by the transmission/reception antenna 126.

Using the time difference Td between the input of the reception pulse with respect to the leakage wave signal and the input of the reception pulse with respect to the reflected wave signal and the speed of light c, the controller 102 calculates the distance L to the distance measurement object 400 by the equation $$L = c \times Td/2.$$

Thus, more accurate distance measurement can be performed, with the delays caused in the distance measuring unit 100-2 being eliminated.

FIG. 6 is a block diagram of a third distance measuring unit as a distance measuring device. The distance measuring unit 100-3 shown in FIG. 6 differs from the first distance measuring unit 100-1 in having a first delay line 132-1 through a nth delay line 132-n (hereinafter also referred to as the delay line(s) 132) and a first adder circuit 134-1 through a nth adder circuit 134-n (hereinafter also referred to as the adder circuit(s) 134), instead of the despreading circuit 122.

The wideband low noise amplifier 120 in the reception unit 116 amplifies the reflected wave signal and the leakage wave signal from the wideband filter 118, and outputs the amplified signals to the first delay line 132-1 through the nth delay line 132-n and the first adder circuit 134-1 through the nth adder circuit 134-n.

The first delay line 132-1 through the nth delay line 132-n have different delay times, and delay and then output the reflected wave signal and the leakage wave signal that have been input. Here, the delay time of the first delay line 132-1 is smaller than the delay time of the nth delay line 132-n.

The first adder circuit 134-1 adds the reflected wave signal and the leakage wave signal input directly from the wideband low noise amplifier 120, to the reflected wave signal and the leakage wave signal supplied from the first delay line 132-1. The first adder circuit 134-1 then outputs the added signals to the controller 102. Likewise, the second adder circuit 134-2 adds the reflected wave signal and the leakage wave signal input directly from the wideband low noise amplifier 120, to the reflected wave signal and the leakage wave signal supplied from the second delay line 132-2. The second adder circuit 134-2 then outputs the added signals to the controller 102. The nth adder circuit 134-*n* adds the reflected wave signal and the leakage wave signal input directly from the wideband low noise amplifier 120, to the reflected wave signal and the leakage wave signal supplied from the nth delay line 132-*n*. The nth adder circuit 134-*n* then outputs the added signals to the controller 102.

The controller 102 detects the delay time of the delay line 132 connected to the adder circuit 134 that has output the signal with the highest amplitude among the first adder circuit 134-1 through the nth adder circuit 134-*n*.

In a case where the wideband low noise amplifier 120 outputs the leakage wave signal and the reflected wave signal shown in FIG. 7A, for example, the first delay line 132-1 delays the leakage wave signal and the reflected signal by time T1, as shown in FIG. 7B, and then outputs the delayed signals to the first adder circuit 134-1. The first adder circuit 134-1 adds the leakage wave signal and the reflected wave signal that are input directly from the wideband low noise amplifier 120 as shown in FIG. 7A, to the leakage wave signal and the reflected wave signal supplied from the first delay line 132-1. The first adder circuit 134-1 then outputs the added signals shown in FIG. 7C to the controller 102.

Likewise, the kth delay line 132-*k* delays the leakage wave signal and the reflected signal by time Tk, as shown in FIG. 7D, and then outputs the delayed signals to the kth adder circuit 134-*k*. The kth adder circuit 134-*k* adds the leakage wave signal and the reflected wave signal that are input directly from the wideband low noise amplifier 120 as shown in FIG. 7A, to the leakage wave signal and the reflected wave signal supplied from the kth delay line 132-*k*. The kth adder circuit 134-*k* then outputs the added signals shown in FIG. 7D to the controller 102.

The controller 102 detects the delay time Tk of the delay line 132-*k* connected to the kth adder circuit 134-*k* that has output the signal with the highest amplitude among the signals that have been output from the adder circuits 134. Here, the signal with the highest amplitude is obtained by adding the reflected wave signal from the wideband low noise amplifier 120 shown in FIG. 7A, to the leakage wave signal delayed by the time Tk at the kth delay line as shown in FIG. 7D. Accordingly, the delay time Tk of the kth delay line 132-*k* represents the time difference between the leakage wave signal and the reflected wave signal.

Further, the time difference between the leakage wave signal and the reflected wave signal is equal to the time difference between the transmission of the transmission wave signal from the transmission antenna 112 and the reception of the reflected wave signal by the reception antenna 114. The time difference between the transmission of the transmission wave signal from the transmission antenna 112 and the reception of the reflected wave signal by the reception antenna 114 represents the time (the real distance measurement time) during which the signal travels back and forth between the distance measuring unit 100-1 and the distance measurement object 400, as the delays caused in the distance measuring unit 100-3 is eliminated. Using the time difference Tk and the speed of light c, the controller 102 calculates the distance L to the distance measurement object 400 by the equation $L = c \times Tk/2$.

Thus, more accurate distance measurement can be performed, with the delays caused in the distance measuring unit 100-3 being eliminated.

Figure 8:
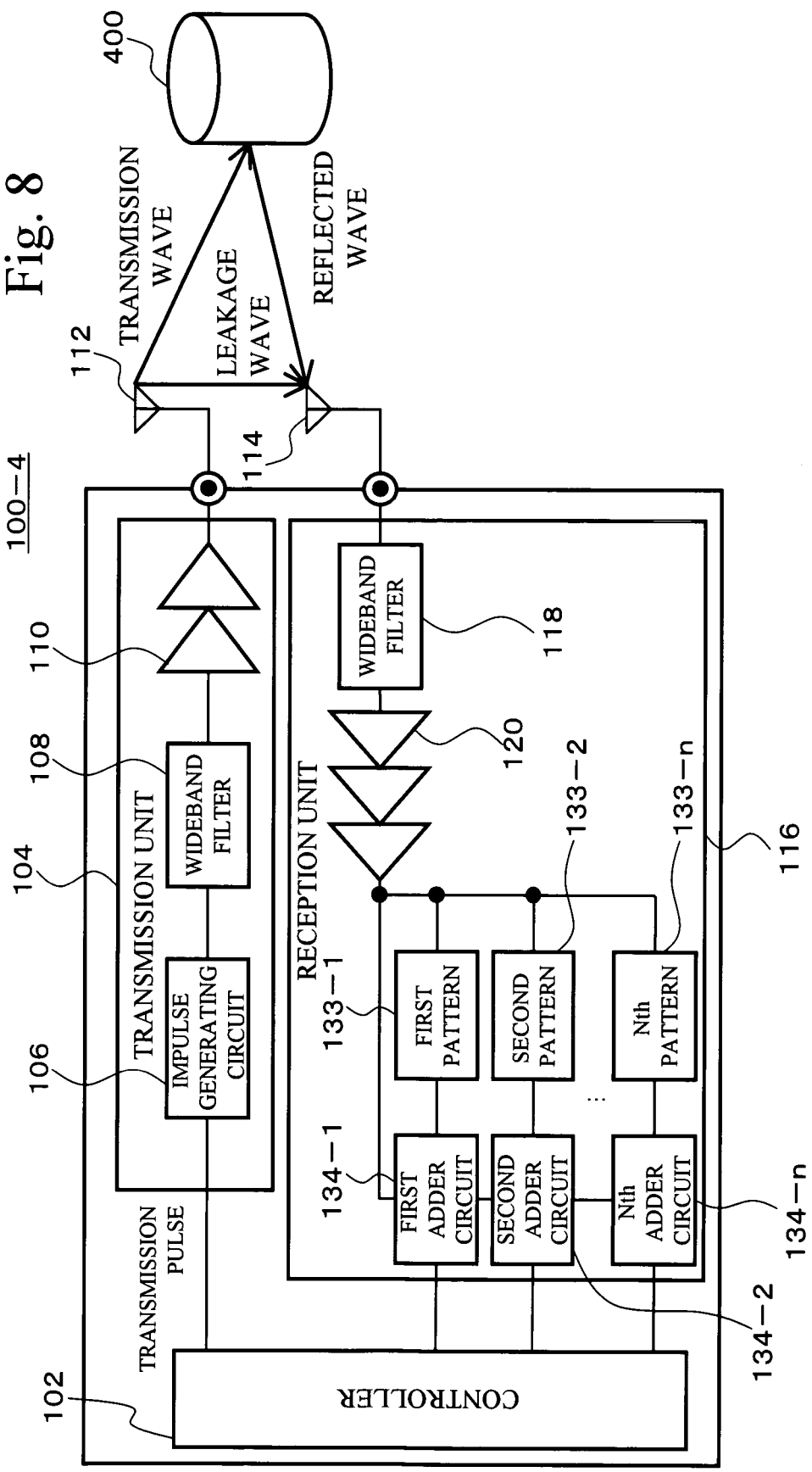
FIG. 8 is a block diagram of a fourth distance measuring unit in accordance with the present invention.

It is also possible to employ patterns 133-1 through 133-*n*, instead of the first delay line 132-1 through the nth delay line 132-*n*, as in a fourth distance measuring unit 100-4 illustrated in FIG. 8. In this case, the delay time of each pattern 133 is proportional to the pattern length.

Figure 9:
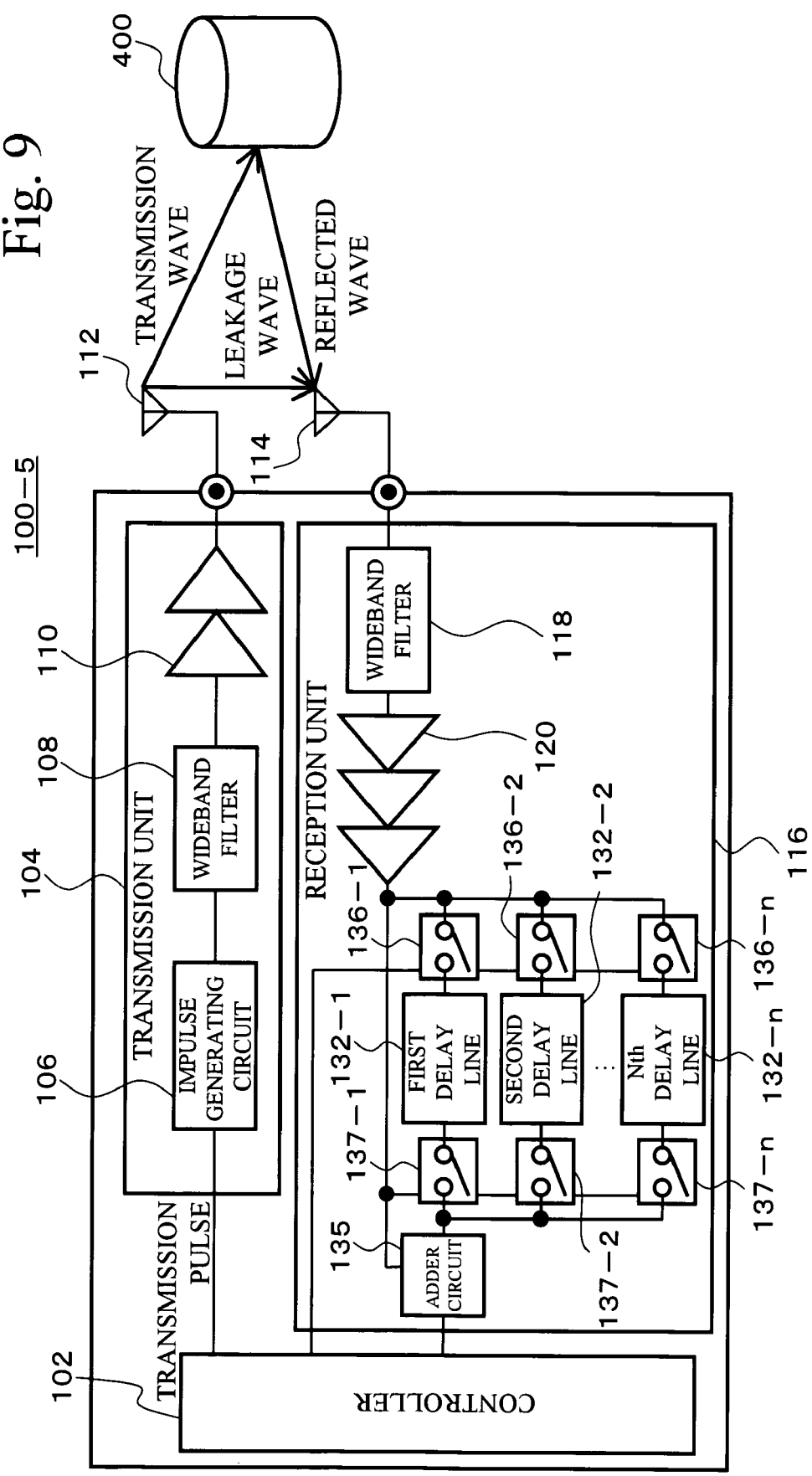
FIG. 9 is a block diagram of a fifth distance measuring unit in accordance with the present invention.

As in a fifth distance measuring unit 100-5 illustrated in FIG. 9, switches 136-1 through 136-*n* and switches 137-1 through 137-*n* may be provided in the previous and later stages of the first delay line 132-1 through the nth delay line 132-*n*, and an adder circuit 135 may be employed. In this case, the output signals from the first delay line 132-1 through the nth delay line 132-*n* are sequentially input to the adder circuit 135 under the control of the controller 102 controlling the switches 136 and 137. Accordingly, the same operation as the operation of the distance measuring unit 100-3 illustrated in FIG. 6 can be performed. In the distance measuring unit 100-5 illustrated in FIG. 9, the delay lines 132 may be replaced with patterns.

Figure 10:
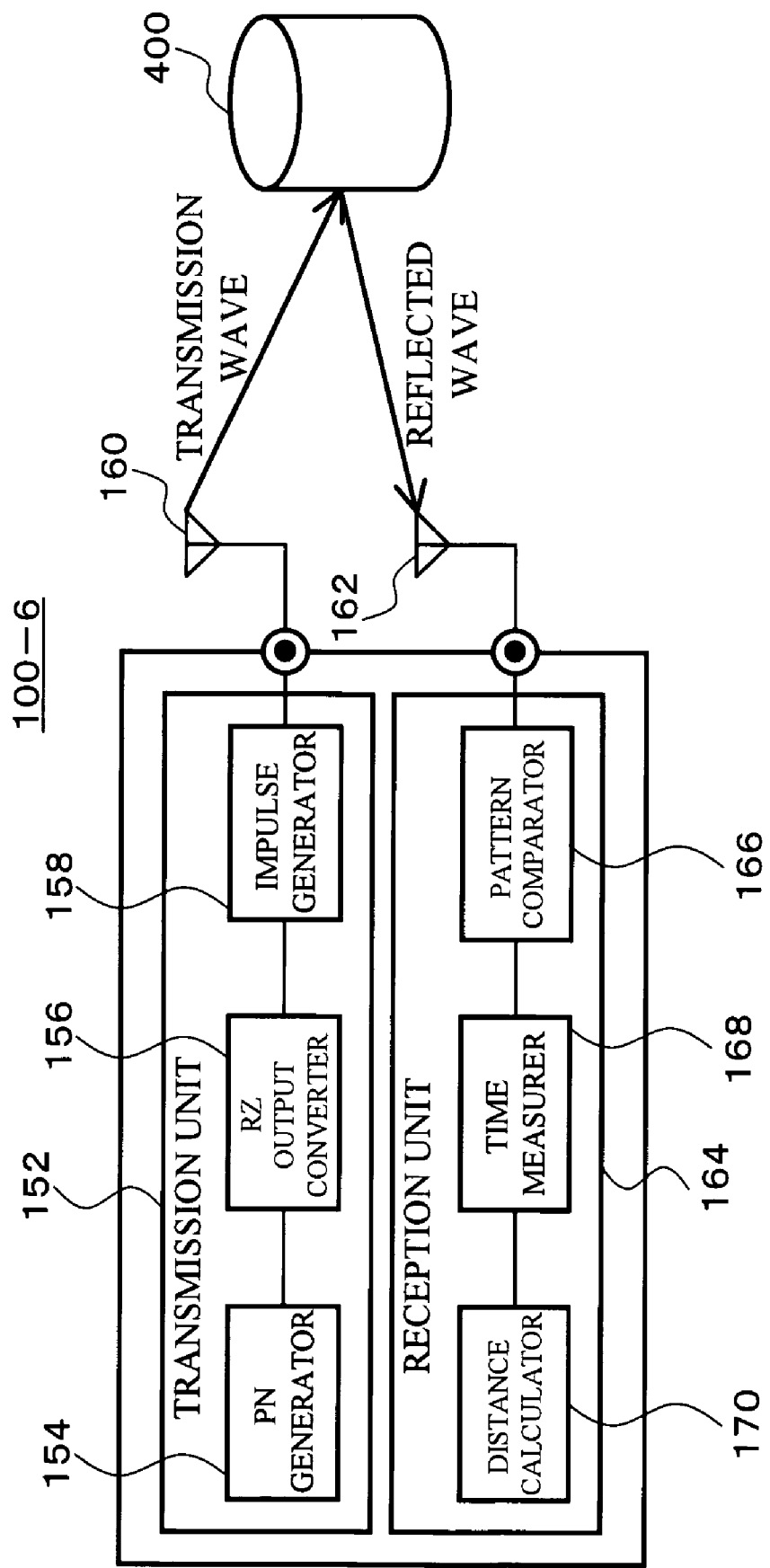
FIG. 10 is a block diagram of a sixth distance measuring unit in accordance with the present invention.

FIG. 10 is a block diagram of a sixth distance measuring unit as a distance measuring device. The distance measuring unit 100-6 illustrated in FIG. 10 measures the distance to the distance measurement object 400. The distance measuring unit 100-6 includes a transmission unit 152, a transmission antenna 160, a reception antenna 162, and a reception unit 164. The transmission unit 152 includes a PN generator 154, a RZ output converter 156, and an impulse generator 158. The reception unit 164 includes a pattern comparator 166, a time measurer 168, and a distance calculator 170.

Next, the operation of the distance measuring unit 100-6 illustrated in FIG. 10 is described. The PN generator 154 in the transmission unit 152 generates a pulse string of pseudo-noise (PN) codes (a PN pulse string). The RZ output converter 156 converts the PN pulse string into a pulse string of RZ (Return to Zero) codes (a RZ pulse string). In a case where the PN pulse string is the one shown in FIG. 11A, for example, the RZ pulse string is the one illustrated in FIG. 11B.

The impulse generator 156 outputs the RZ pulse string output from the RZ output converter 156 into the impulse string shown in FIG. 1C. As illustrated in FIG. 12, the impulse generator 158 includes capacitors 172 and 173 that are connected in series between the RZ output converter 156 and the transmission antenna 160, and a step recovery diode 174 that is connected between the ground and the capacitors 172 and 173. With this structure, high-speed switching can be performed. If the impulse string is in the range of 3.1 GHz to 10.7 GHz, ultra wideband (UWB) communication can be performed. The impulse generator 158 may convert the PN pulse string output from the PN generator 154 directly into an impulse string, without the employment of the RZ output converter 156.

The transmission antenna 160 transmits the impulse string output from the impulse generator 158 as a transmission wave signal (see FIG. 12A). The transmission wave signal transmitted from the transmission antenna 160 is reflected by the distance measurement object 400. The reception antenna 162 receives the reflected wave signal. The reflected wave signal contains noise as well as the reflected wave component (see FIG. 12B).

The pattern comparator 166 in the reception unit 164 generates reference signals that are formed by delaying the RZ pulse string output from the RZ output converter 156, which is the RZ pulse string corresponding to the PN codes used by the PN generator 154, by different delay times. The correlation between the reflected wave signal and each of the reference signals is detected. For example, in a case where first through fourth reference signals are generated as shown in FIGS. 13C through 13F, the correlation between the fourth reference signal and the reflected wave signal is the largest.

The pattern comparator 166 outputs the results of the correlation detection to the time measurer 168.

The time measurer 168 detects the delay time of the reference signal having the largest correlation with the reflected wave signal. In the example shown in FIGS. 11A through 11C, the delay time τ of the fourth reference signal is detected. The delay time is equal to the time difference between the transmission of the transmission wave signal by the transmission antenna 160 and the reception of the reflected wave signal by the reception antenna 162.

The distance calculator 170 calculates the distance to the distance measurement object 400, using the delay time detected by the time measurer 168. More specifically, using the delay time τ and the speed of light c, the distance measurer 170 calculates the distance L to the distance measurement object 400 in accordance with the equation $$L = c \times \tau / 2.$$

As described above, in the distance measuring unit 100-6, the correlation between the reflected wave signal corresponding to PN codes and each reference signal corresponding to the PN codes is detected to calculate the distance to the distance measurement object 400. Accordingly, the resistance to noise is increased, and accurate distance measurement can be performed.

Figure 14:
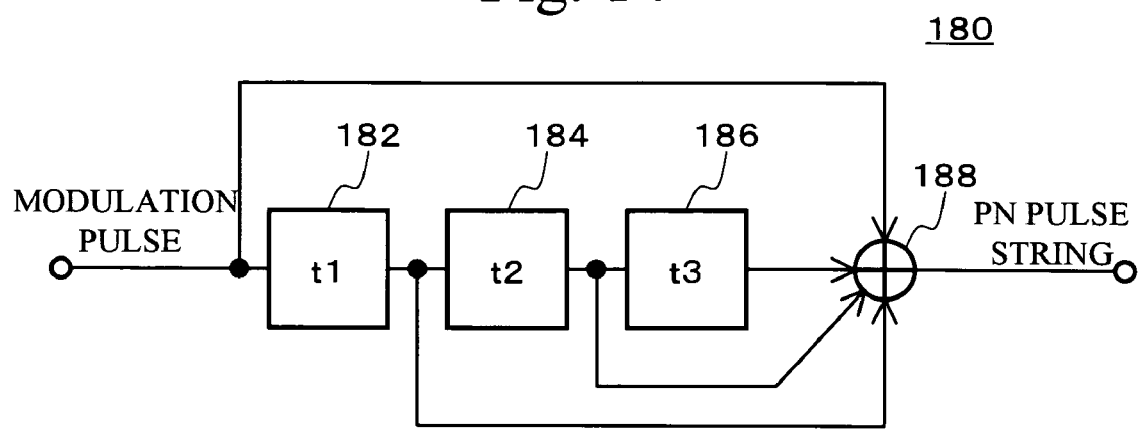
FIG. 14 is a block diagram of a delay circuit that can be employed in the sixth distance measuring unit.

In the distance measuring unit 100-6, a delay circuit may be provided in the PN generator 154 to generate a PN pulse string. FIG. 14 is a block diagram of a delay circuit 180. In the delay circuit 180 illustrated in FIG. 14, delay elements 182, 184, and 186 have delay times corresponding to PN codes. More specifically, the delay element 182 delays a modulation pulse supplied from the outside by time t1, and then outputs the delayed pulse. The delay element 184 delays the modulation pulse supplied from the delay element 182 by time t2, and then outputs the delayed pulse. Accordingly, the modulation pulse output from the delay element 184 is delayed by time t1+t2. The delay element 186 delays the modulation pulse supplied from the delay element 184 by time t3, and then outputs the delayed pulse. Accordingly, the modulation pulse output from the delay element 186 is delayed by time t1+t2+t3. A combiner 188 combines the modulation pulses supplied from the delay elements 182, 184, and 186, so as to generate a PN pulse string. The PN pulse string is then output to the RZ output converter 156.

Figure 15:
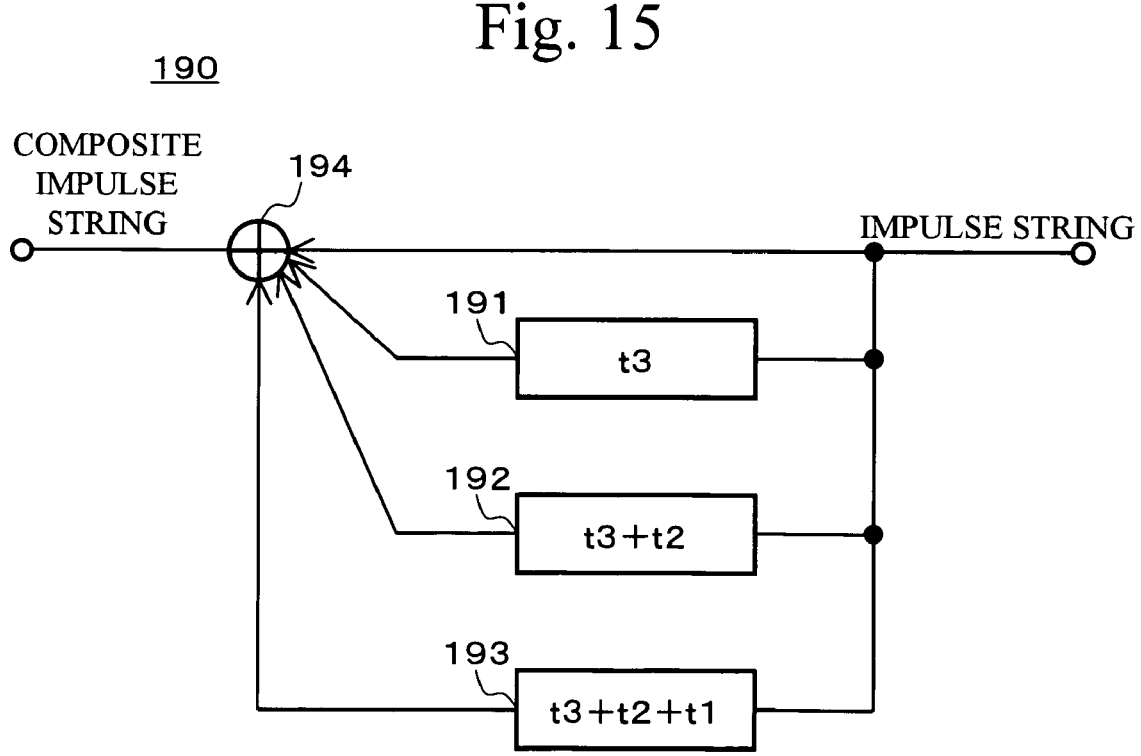
FIG. 15 is a block diagram of a delay/combiner circuit that can be employed in the sixth distance measuring unit.

In the case where the delay circuit 180 is provided in the PN generator 154, a delay/combiner circuit is provided in the pattern comparator 166. FIG. 15 is a block diagram of a delay/combiner circuit 190. In the delay/combiner circuit 190 illustrated in FIG. 15, an impulse string that is the reflected wave signal from the reception antenna 162 is input directly to a combiner 194, and is also input to delay elements 191, 192, and 193.

The delay element 191 delays the impulse string supplied from the reception antenna 162 by time t3, and then outputs the delayed impulse string. The delay element 192 delays the impulse string supplied from the reception antenna 162 by time t3+t2, and then outputs the delayed impulse string. The delay element 193 delays the impulse string supplied from the reception antenna 162 by time t3+t2+t1, and then outputs the delayed impulse string.

In a case where the impulse string input from the reception antenna 162 directly to the combiner 194 is the one shown in FIG. 16A, the impulse string input from the delay element 191 to the combiner 194 is delayed by time t3 as shown in FIG. 16B. The impulse string input from the delay element 192 to the combiner 194 is delayed by time t3+t2 as shown in FIG. 16C. The impulse string input from the delay element 193 to the combiner 194 is delayed by time t3+t2+t1 as shown in FIG. 16D.

Here, the delay time t3 at the delay element 191 is obtained by subtracting the delay time t1+t2 from the longest delay time t1+t2+t3 among the delay times t1, t1+t2, and t1+t2+t3 in the delay circuit 180. The delay time t3+t2 at the delay element 192 is obtained by subtracting the delay time t1 from the longest delay time t1+t2+t3 in the delay circuit 180, and the delay time t3+t2+t1 at the delay element 193 is obtained as the longest delay time t1+t2+t3 in the delay circuit 180. The delay time for the impulse string input from the reception antenna 162 directly to the combiner 194 is obtained by subtracting the longest delay time t1+t2+t3 from the longest delay time t1+t2+t3 in the delay circuit 180, which is zero.

The combiner 194 combines the impulse strings supplied from the reception antenna 162 and the delay elements 191, 192, and 193, so as to output the composite impulse string.

In the case where the impulse strings shown in FIGS. 16A through 16D are input to the combiner 194, the same timing of the input to the combiner 194 is applied to the fourth impulse of the impulse string input from the reception antenna 162 directly to the combiner 194 (the impulse delayed by the time t1+t2+t3 in the delay circuit 180), the third impulse of the impulse string input from the delay element 191 to the combiner 194 (the impulse delayed by the time t1+t2 in the delay circuit 180), the second impulse of the impulse string input from the delay element 192 to the combiner 194 (the impulse delayed by the time t1 in the delay circuit 180), and the first impulse of the impulse string input from the delay element 193 to the combiner 194 (the impulse not delayed in the delay circuit 180). Accordingly, a peak appears as shown in FIG. 16E.

The pattern comparator 166 detects the correlation between the composite impulse string and each of the reference signals. The time measurer 168 detects the delay time of the reference signal having the largest correlation with the composite impulse string. Further, the time measurer 168 subtracts the longest delay time t1+t2+t3 in the delay/combiner circuit 190 from the detected delay time of the reference signal, so as to calculate the time difference between the transmission of the transmission wave signal by the transmission antenna 160 and the reception of the reflected wave signal by the reception antenna 162. Using the time difference T calculated by the time measurer 168, the distance calculator 170 calculates the distance to the distance measurement object 400. More specifically, using the time difference T and the speed of light c, the distance calculator 170 calculates the distance L to the distance measurement object 400 in accordance with the equation $$L = c \times T / 2.$$

As described so far, a distance measuring device in accordance with the present invention can increase the accuracy in distance measurement, and is beneficial for accurate distance measurement.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A distance measuring device that measures a distance to an object, comprising:

an impulse generator that generates an impulse;

a transmission antenna that transmits the impulse generated by the impulse generator;

a reception antenna that receives a reflected signal of the impulse, transmitted from the transmission antenna and reflected by the object, and a leakage signal of the impulse, transmitted from the transmission antenna;

a distance calculator that calculates the distance to the object, based on the a time difference between the reflected signal and the leakage signal received by the reception antenna;

a delay unit that delays the reflected signal and the leakage signal by a plurality of delay times; and an adder unit that adds the delayed reflected signal and the delayed leakage signal to the reflected signal and the leakage signal, respectively, wherein the distance calculator calculates the distance to the object, based on a delay time for an output signal having the highest amplitude among output signals of the adder unit.

2. The distance measuring device as claimed in claim 1, wherein the delay unit delays each reflected signal and each leakage signal by a different delay time from others.

3. The distance measuring device as claimed in claim 1, wherein the delay unit includes a plurality of delay lines having different delay times.

4. The distance measuring device as claimed in claim 1, wherein the delay unit includes a plurality of pattern lines having different transmission path lengths.

5. A distance measuring device that measures the distance to an object, comprising:

an impulse string generator that generates an impulse string based on a pseudo-noise code;

a transmission antenna that transmits the impulse string generated by the impulse string generator;

a reception antenna that receives a reflected signal of the impulse string transmitted from the transmission antenna and reflected by the object;

a distance calculator that calculates the distance to the object, based on a correlation between the reflected signal received by the reception antenna and the pseudo-noise code; and a delay/combiner unit that delays the reflected signal received by the reception antenna by a plurality of delay times, and then combines the respective delayed signals, wherein the distance calculator calculates the distance to the object, based on the amplitude of the output signal of the delay/combiner unit.

6. The distance measuring device as claimed in claim 5, wherein the impulse string generator converts the pseudo-noise codes into RZ codes, to generate the impulse string.

7. A method for determining a distance to an object, comprising:

detecting a reflected signal of an electromagnetic impulse reflected by the object, and a leakage signal of the electromagnetic impulse;

delaying the reflected signal and the leakage signal by a plurality of delay times and adding the delayed reflected signal and the delayed leakage signal to the reflected signal and the leakage signal, respectively; and calculating the distance to the object, based on a time difference between the reflected signal and the leakage signal determined from a time difference between respective highest amplitudes of the added reflected signal and the added leakage signal.

* * * * *

UNITED STATES PATENT AND TRADEMARK OFFICE
CERTIFICATE OF CORRECTION

PATENT NO. : 7,525,477 B2
APPLICATION NO. : 11/331073
DATED : April 28, 2009
INVENTOR(S) : Shigemi Kurashima et al.

It is certified that error appears in the above-identified patent and that said Letters Patent is hereby corrected as shown below:

Column 11, Line 9, change "the a" to --a--.

Signed and Sealed this

First Day of September, 2009

David J. Kappos
*Director of the United States Patent and Trademark Office*